UNITED STATES PATENT OFFICE.

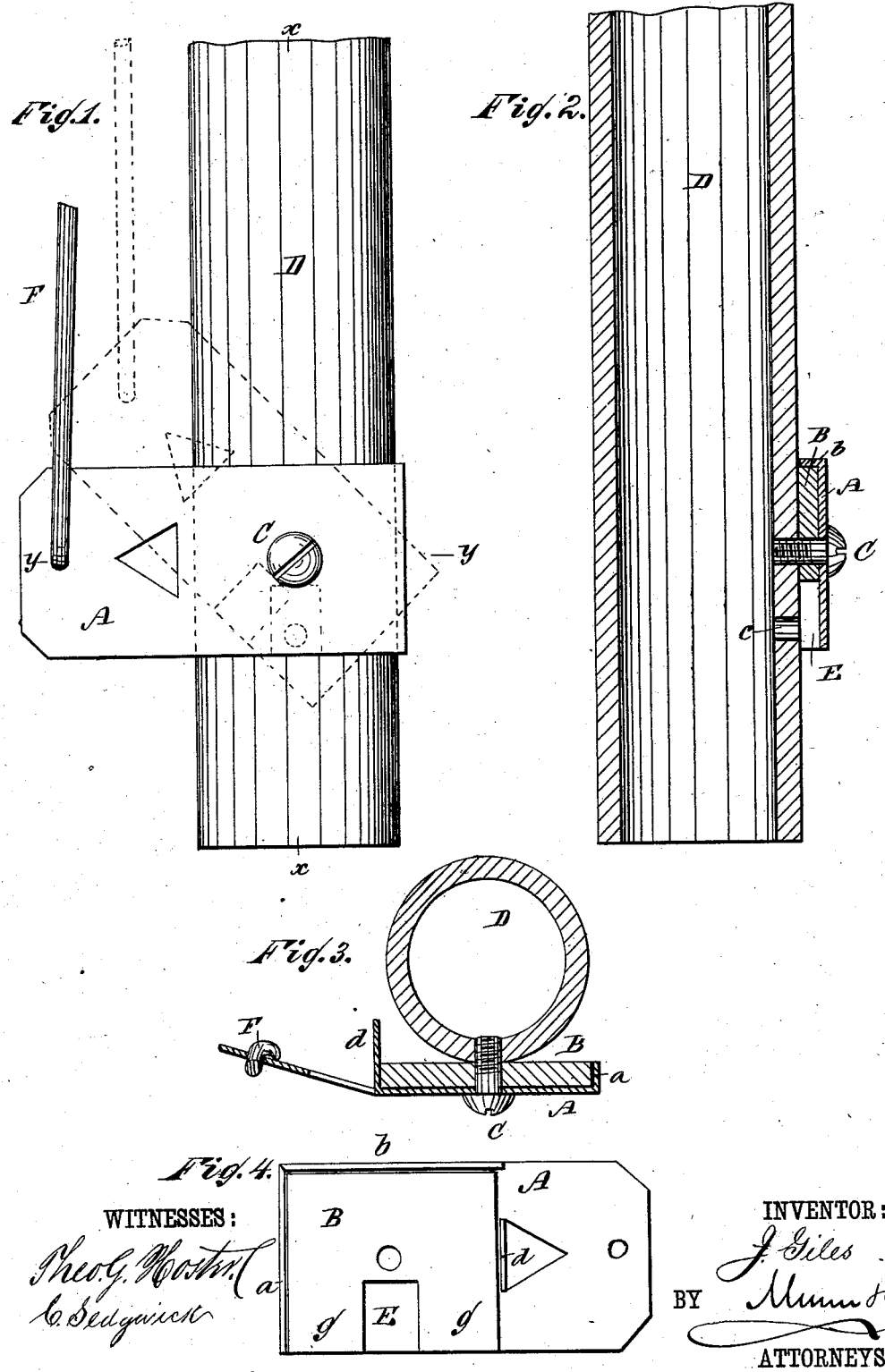

JEROME GILES, OF SOUTH BEND, INDIANA.

WASTE-VALVE FOR PUMPS.

SPECIFICATION forming part of Letters Patent No. 255,276, dated March 21, 1882.

Application filed December 27, 1881. (No model.)

*To all whom it may concern:*

Be it known that I, JEROME GILES, of South Bend, in the county of St. Joseph and State of Indiana, have invented a new and useful Improvement in Waste-Valves for Pumps, of which the following is a full, clear, and exact description.

Reference is to be had to the accompanying drawings, forming a part of this specification, in which similar letters of reference indicate corresponding parts in all the figures.

Figure 1 is an elevation of the valve applied to the pump-tubing. Fig. 2 is a vertical section of the valve and tubing, taken on the line $x\ x$ of Fig. 1. Fig. 3 is a sectional plan view of the same, taken on the line $y\ y$ of Fig. 1; and Fig. 4 is a plan view of the under side of the valve.

The object of this invention is to provide an efficient waste-valve of simplified and inexpensive construction, and a valve which can be easily applied to all kinds of pump-tubing.

In the accompanying drawings, A represents the valve-plate, B a packing of sole-leather or other similar material, and C the bolt or screw upon which the valve is pivoted, and by which it is secured to the pump-tube D, which tube is formed with the small orifice $c$ for the escape of the waste water.

The plate A is preferably struck up from sheet brass, zinc, or other metal not subject to oxidation in water, with the flanges $a$ and $b$, and also with the point or strip $d$, which serves as a stop to come against the side of the pump-tube for limiting the distance of movement of the valve upon the pivot. The flanges $a$ and $b$ form a kind of recess for the packing B to rest in, as shown clearly in Figs. 2 and 3. The packing is cut away, so as to form the passage E for the waste water from the pump, which permits the water to escape when the valve is turned, so that this passage registers with the orifice $c$ of the pump-tube. The parts $g$ of the packing on either side of the passage E serve to effectually close the orifice $c$ when the valve is moved upon its pivot either up or down from that position of the valve which opens the orifice $c$. This valve is operated for opening and closing the orifice $c$ by the rod F, which is attached to the valve, as shown in Figs. 1 and 3, and leads from thence up to the platform or curb of the well.

Though it is preferable to form the plate with the slot $d$ stamped out of the metal of the valve, thus making the valve complete in itself, it is obvious that this is not necessary, as any other form of stop might be used and accomplish the same result.

It will be seen that the passage E and the orifice $c$ are covered by the plate A, so that the stream of waste water from the pump-tube will be deflected by the plate immediately down into the well and prevents the stream going against the wall of the well.

The valve constructed in this manner is very simple, cheap, and effective, and may be attached to wooden or metal pump-tubing with equal facility.

Having thus described my invention, I claim as new and desire to secure by Letters Patent—

1. The herein-described waste-valve, consisting of the plate A, provided with the flanges $a$ $b$ and the stop $d$, and the packing B, provided with the passage E, substantially as specified.

2. The plate A, formed with the flanges $a$ and $b$ and the stop $d$, in combination with the packing B and the rod F, the packing being formed with the cut-away place or passage E, substantially as described.

3. The plate A, covering or inclosing the passage E in the packing B, and adapted to deflect the stream of waste water, substantially as and for the purposes described.

JEROME GILES.

Witnesses:
JOSEPH HOLLAND,
FRANK X. VILARE.